(12) United States Patent
Tran

(10) Patent No.: US 6,567,124 B1
(45) Date of Patent: May 20, 2003

(54) ELECTRONIC IMAGE PROCESSING TECHNIQUE FOR ACHIEVING ENHANCED IMAGE DETAIL

(75) Inventor: Tuan Tran, Arvada, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 09/452,943

(22) Filed: Dec. 1, 1999

(51) Int. Cl.[7] .......................... H04N 5/20; H04N 5/228; H04N 5/235; H04N 5/202; G03F 3/08

(52) U.S. Cl. ................. 348/255; 348/222.1; 348/229.1; 348/673; 348/674; 358/519

(58) Field of Search .................... 348/222, 229, 348/254, 255, 671, 673, 674, 216, 217, 304, 308, 222.1, 229.1, 216.1, 217.1; 358/519; 327/134, 272, 355

(56) References Cited

U.S. PATENT DOCUMENTS

| | | | |
|---|---|---|---|
| 3,599,104 A | * 8/1971 | Peil et al. ................. 327/351 |
| 4,507,615 A | * 3/1985 | Bateman ................. 327/334 |
| 4,628,362 A | * 12/1986 | Waehner ................. 348/572 |
| 4,680,489 A | * 7/1987 | Stetson ................. 348/304 |
| 4,799,106 A | 1/1989 | Moore et al. ............ 358/168 |
| 4,837,625 A | 6/1989 | Douziech et al. ......... 358/174 |
| 4,926,247 A | * 5/1990 | Nagasaki et al. ......... 348/262 |
| 5,223,935 A | 6/1993 | Tsuji et al. ............. 358/228 |
| 5,241,575 A | * 8/1993 | Miyatake et al. ......... 257/226 |
| 5,387,930 A | * 2/1995 | Toh .................... 348/229.1 |
| 5,455,621 A | 10/1995 | Morimura ............... 348/229 |
| 5,614,948 A | 3/1997 | Hannah ................. 348/255 |
| 5,691,821 A | * 11/1997 | Hieda et al. ............ 348/255 |
| 5,712,682 A | 1/1998 | Hannah ................. 348/255 |
| 5,729,287 A | * 3/1998 | Morimoto .............. 348/241 |
| 5,737,033 A | * 4/1998 | Masuda ................. 348/678 |
| 5,892,541 A | * 4/1999 | Merrill ................. 348/304 |
| 5,900,918 A | * 5/1999 | White .................. 348/674 |
| 6,040,570 A | * 3/2000 | Levine et al. ........... 348/308 |
| 6,040,860 A | * 3/2000 | Tamura et al. .......... 348/252 |
| 6,246,436 B1 | * 6/2001 | Lin et al. .............. 348/308 |

FOREIGN PATENT DOCUMENTS

JP 09065271 A * 3/1997 .......... H04N/5/765

* cited by examiner

Primary Examiner—Wendy R. Garber
Assistant Examiner—John M Villecco
(74) Attorney, Agent, or Firm—Sheridan Ross P.C.

(57) ABSTRACT

An imaging system for achieving enhanced image detail includes a sensor subsystem, an electronic image processing subsystem, and an automatic gain control (AGC) unit. The sensor unit is operative for sensing an image received from an exterior environment and for converting the image to an electrical representation having a peak value that is related to the dynamic range of the image. The electrical representation is then processed in the electronic image processing subsystem using a unique multiple order, non-linear transfer function that processes the signal in a manner that is dependent upon the dynamic range of the input image. The output signal of the electronic image processing subsystem is then applied to the AGC unit which performs a conventional AGC function on the signal. Thus, the imaging system automatically adjusts to changing scene content in the input image in a dynamic manner.

23 Claims, 5 Drawing Sheets

ELECTRONIC IMAGE PROCESSING TECHNIQUE FOR ACHIEVING ENHANCED IMAGE DETAIL

FIELD OF THE INVENTION

The invention relates generally to imaging systems and, more particularly, to techniques for processing image signals in an imaging system.

BACKGROUND OF THE INVENTION

Since the advent of low light imaging, concerns have centered on the ability to enhance or stretch low light level details within a single image frame while preserving higher light level information within the same image. In the past, fixed, non-linear routines were used that amplified the low level signal detail to a greater extent than the higher level signal detail. These fixed algorithms provide some degree of image enhancement, primarily in the low light portions of the image, but are not capable of dynamically adjusting to changing scene content (e.g., changes in the relative amount of light and dark content). In addition, these prior systems often use a "first order" correction function (e.g., a gamma function) that seriously compresses the high light level detail, thus reducing contrast in the image. Other prior art systems have used a feedback approach to enhance signal quality by feeding back a signal from the signal processing circuitry to the image sensor circuitry for use in adjusting the sensor settings based on image content. While such feedback systems can improve signal quality significantly, the delays caused by the feedback loop often result in slow, choppy video operation characterized by frequent blankouts and the like.

Therefore, there is a need for a method and apparatus for enhancing low intensity detail in an electronic image signal without adversely effecting the high intensity detail of the image. Preferably, the method and apparatus will be capable of enhancing both the low and the high intensity detail. In addition, there is a need for a method and apparatus for processing an image signal that is capable of automatically adjusting to changes in scene content without the use of signal feedback techniques.

SUMMARY OF THE INVENTION

The present invention relates to an image processing technique that is capable of enhancing both high and low level detail in an image signal simultaneously. In addition, the image processing technique automatically adjusts the type of processing applied to the image signal based on the content (i.e., the dynamic range) of the input image. The processing technique of the present invention is particularly suited for use in low-light-level imaging systems where a typical scene includes a large amount of low intensity detail. Occasionally, a low-light-level scene will have one or more high intensity point sources of light (e.g., headlights on an automobile) that significantly increase the overall dynamic range of the scene, but which add relatively little mid-intensity detail to the scene. The principles of the present invention allow such low light level scenes to be processed in a manner that enhances both the low light level detail and the high light level detail (when present) at the expense of the middle level portions of the scene. In addition, the type of processing that is applied to the input image will automatically adjust as the dynamic range of the scene varies (e.g., as point sources of light appear and disappear from the scene). This automatic adjustment is achieved without the use of feedback between the processing circuitry and the sensing circuitry, thus avoiding the problems often associated with such feedback techniques.

A sensor subsystem is provided that senses an external image and converts the image to an electrical representation having a peak value that is indicative of the dynamic range of the image. The electrical image signal is then applied to an electronic image processing subsystem having a unique multiple order, non-linear transfer function. The transfer function of the electronic image processing subsystem includes a first portion for modifying low level components of the image signal using gains in a first gain range, a second portion for modifying medium level components of the image signal using gains in a second gain range, and a third portion for modifying high level components of the image signal using gains in a third gain range. Both the first and third gain range are higher than the second gain range so that high and low level components in the image signal are expanded while medium level components are compressed. The multiple order, non-linear transfer function of the electronic image processing subsystem can be implemented using either analog or digital circuitry.

Because the sensor subsystem outputs an image signal having a peak value that is indicative of the dynamic range of the image, the type of processing that is applied using the transfer function of the electronic image processing subsystem will automatically adjust to the dynamic range of the image. That is, low dynamic range signals will be processed solely by the first portion of the transfer function, medium dynamic range signals will be processed by both the first and second portions of the transfer function, and high dynamic range signals will be processed using all three portions of the transfer function. Thus, the third portion of the transfer function will only be used when the difference between the lowest level detail and the highest level detail in the scene exceeds a predetermined value (e.g., a low light level scene with one or more point sources of light).

In a preferred embodiment of the invention, the first and second portions of the transfer function utilize a non-linear transfer characteristic that provides elevated gain to lower level input signal components while providing a more compressed gain as input levels rise. The third portion of the transfer function utilizes a linear transfer characteristic that provides a relatively large linear gain to the high level input signal components. This transfer function can be generated, for example, using a log amplifier, a linear amplifier, and a selection unit. The log amplifier and the linear amplifier each receive the electronic image signal from the sensor subsystem and amplify the signal according to respective transfer profiles. The selection unit then selects the larger of the output signals from the two amplifiers to generate the output signal of the electronic image processing subsystem. By properly selecting the gain characteristics of the two amplifiers, an overall transfer function can be generated that has the desired shape.

The output of the electronic image processing subsystem is applied to an automatic gain control (AGC) unit that modifies the signal so that a peak amplitude of the signal assumes a predetermined value. Preferably, the AGC unit will be a linear device that applies equal gain to all input signal levels. The output image signal of the AGC unit is delivered to a storage/display unit for storage and/or display.

DETAILED DESCRIPTION OF A PREFERRED EMBODIMENT

The present invention relates to an image processing technique for use in an imaging system. The technique utilizes a unique multiple order, non-linear transfer function to enhance the detail in a captured image. The transfer function is capable of expanding both low level and high level detail within a scene simultaneously while compressing middle level detail in the same scene. The technique is capable of adjusting the type of processing that is applied to an image signal based on the dynamic range of the corresponding image. In this manner, optimal image enhancement can be achieved dynamically as the a content of the input image changes. In addition, the technique does not require the use of feedback between the image processing circuitry and the image sensor circuitry to achieve its dynamic qualities. The technique can be used in virtually any imaging system, although it is particularly beneficial when used in low light level imaging systems.

Figure 1:
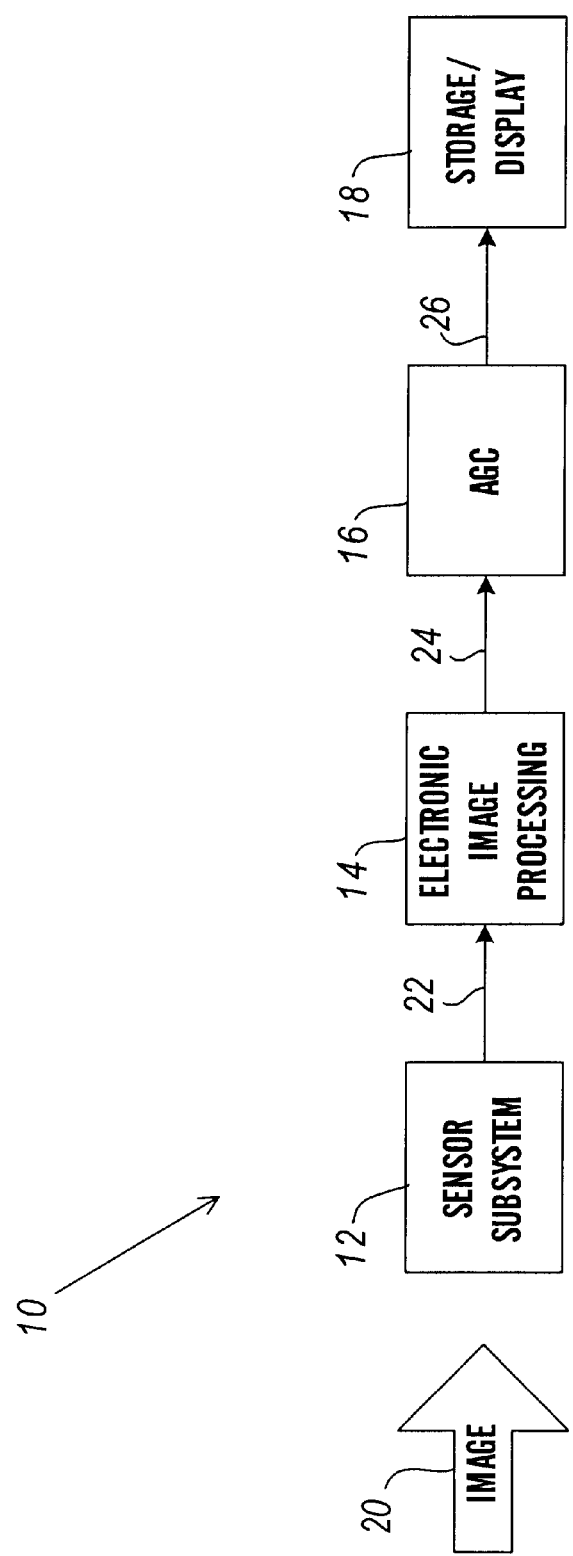
FIG. 1 is a block diagram illustrating an imaging system in accordance with one embodiment of the present invention.

FIG. 1 is a block diagram illustrating an imaging system 10 in accordance with one embodiment of the present invention. The imaging system 10 can be part of, for example, a still or video camera system for recording and/or displaying one or more images sensed from an exterior environment. As illustrated, the imaging system 10 includes: a sensor subsystem 12, an electronic image processing subsystem 14, an automatic gain control (AGC) unit 16, and a storage/display unit 18. The sensor subsystem 12 receives a light image 20 at an input thereof and coverts the light image 20 to an electrical image signal 22. The electrical image signal 22 is then delivered to the electronic image processing subsystem 14 which processes the electrical image signal 22 to enhance the detail of the signal in a predetermined manner. The electronic image processing subsystem 14 then outputs an enhanced electrical image signal 24 that is delivered to the AGC unit 16 for amplitude adjustment. The AGC unit 16 modifies the enhanced electrical image signal 24 so that a peak amplitude of the signal 24 assumes a predetermined level. The AGC unit 16 then outputs a final electrical image signal 26 to the storage/display unit 18 for storage and/or display. The storage/display unit 18 can include any storage and/or display device that is capable of storing or displaying the final electrical image signal 26 output by the AGC 16.

The sensor subsystem 12 can include virtually any form of sensor device that is capable of capturing an input image and converting the image into an electrical representation. For example, the sensor subsystem 12 can include a charge coupled device (CCD) for performing the sensing function. As is well known, a CCD is a semiconductor device having an array of charge wells (e.g., MOS capacitors) arranged on a substrate. During operation, a light image is projected onto the charge wells and each of the charge wells then accumulates charge at a rate proportional to the intensity of light incident upon the charge well. After an "integration period" of charge accumulation has ended, the charge in each of the charge wells is shifted out of the CCD in a serial row-by-row manner. The resulting signal is thus an electrical representation of the original light image. In a video system, the process of accumulating and shifting charge is repeated continuously at a predetermined video rate.

In a preferred embodiment of the invention, the sensor subsystem 12 includes, in addition to the sensor device itself, means for enhancing the dynamic range of the captured light image during the sensing process. For example, techniques such as those disclosed in U.S. patent application Ser. No. 09/241,981 ('981), filed on Feb. 2, 1999 and assigned to the same assignee as the present application, can be used to enhance the dynamic range of the captured image. In the '981 application, a technique is disclosed wherein both the well depth of the charge wells in the CCD and the nominal intensity of the input light image that reaches the CCD are varied in a predetermined manner during the integration period of the CCD to increase the dynamic range of the resulting signal. This technique is particularly beneficial in low light level imaging systems. In a similar but less complex technique, just the well depth is varied during the integration period. In addition to these techniques, any of a plurality of other techniques can be utilized to enhance dynamic range in the sensor subsystem 12. Although sensor-based dynamic range enhancement techniques will generally improve the overall performance of the imaging system 10, it should be appreciated that such techniques are not required to achieve image enhancement in accordance with the present invention.

In accordance with the present invention, the electrical image signal 22 output by the sensor subsystem 12 will have a peak amplitude that is indicative of the dynamic range of the input image currently being sensed. That is, if the current input image 20 has a low dynamic range, the peak amplitude of the output signal 22 of the sensor subsystem 12 will be relatively low. Similarly, if the input image 20 has a high dynamic range, the peak amplitude of the output signal 22 will be relatively high. As will be described in greater detail, this feature of the sensor subsystem 12 contributes to the "dynamic" nature of the present invention. In a preferred approach, the sensor subsystem 12 will include functionality for maintaining a constant average output signal level regardless of the makeup of the input image. For example, the sensor subsystem 12 can include a light level control system, such as a variable iris or light integration control, for performing this function.

As described above, the electronic image processing subsystem 14 processes the electrical image signal 22 output by the sensor subsystem 12 to enhance the detail or contrast within the signal. The electronic image processing subsystem 14 can utilize either analog or digital processing techniques to achieve its processing function. In one embodiment, for example, the electrical image signal 22 received by the electronic image processing subsystem 14 is a digital signal. In such an embodiment, the electronic image processing subsystem 14 will generally include at least one digital processing device for processing the digital output signal of the sensor subsystem 12. For example, the electronic image processing subsystem 14 can include a general purpose microprocessor (GPP), a digital signal processor (DSP), a reduced instruction set computer (RISC), a complex instruction set computer (CISC), a digital field programmable gate array (FPGA), and/or an application specific integrated circuit (ASIC) device. Other digital processing devices are also possible. In an alternate embodiment, the electrical image signal 22 received from the sensor subsystem 12 is an analog electrical signal. In such an embodiment, the electronic image processing subsystem 14 can include analog circuitry for performing the processing function or an A/D converter can be used at the input of the unit 14 to convert the analog input signal to a digital representation that can then be digitally processed as described above.

The electrical image processing subsystem 14 applies a multi-order, non-linear transfer function to the electrical image signal 22, the overall effect of which depends upon the dynamic range of the input image 20. That is, low dynamic range images will be processed differently from medium dynamic range images which will be processed differently from high dynamic range images. Significantly, the change in processing profile occurs automatically with changes in signal content without the need for time consuming image feedback to vary the profile. Thus, scenes that include predominantly low intensity detail will generally be stretched to increase contrast within the resulting image signal as much as possible. Scenes with both low and medium level detail will be enhanced so that the low level detail is enhanced to a greater extent than the medium level detail. High dynamic range signals having both low intensity detail as well as regions of high intensity (e.g., point sources of light) will be stretched at both the high and low intensities, while medium intensity portions of the signal will be compressed.

Figure 2:
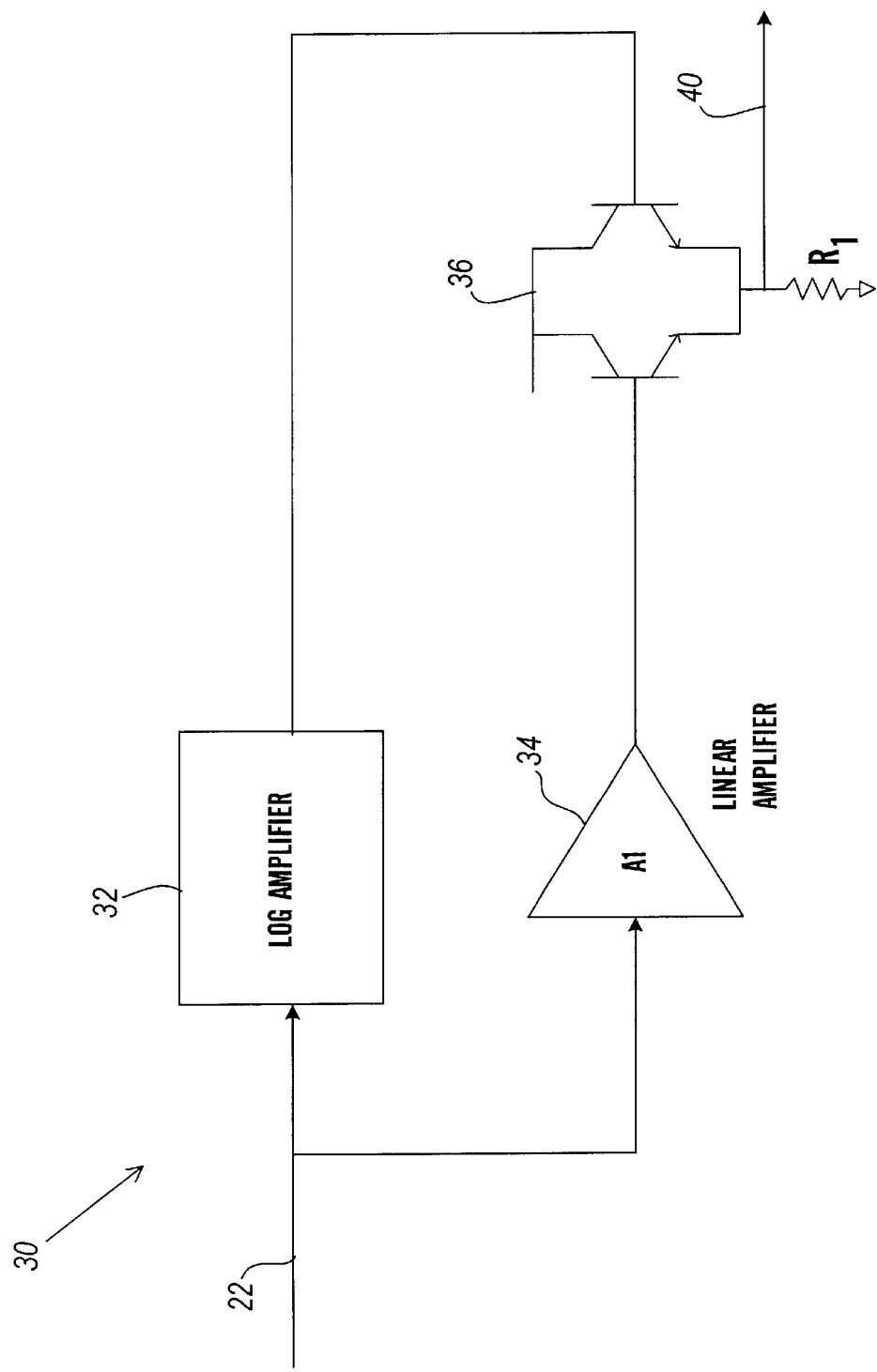
FIG. 2 is a block diagram illustrating analog circuitry for use within the electronic image processing subsystem of FIG. 1 in one embodiment of the present invention.

FIG. 2 is a block diagram illustrating analog circuitry 30 that can be used for providing the multi-order, non-linear transfer function in the electronic image processing subsystem 14. The circuitry 30 includes: a log amplifier 32, a linear amplifier 34, and a selection device 36. The log amplifier 32 and the linear amplifier 34 each receive the electrical image signal 22 from the sensor subsystem 12 and amplify the signal 22 according to a corresponding transfer function. The transfer function of the log amplifier 32 is a non-linear function of input signal level while the transfer function of the linear amplifier 34 is a linear function of input signal level. The selection unit 36 receives the output signals from the log amplifier 32 and the linear amplifier 34 and selects whichever one of the two signals is greater at any particular time to transfer to the output thereof. Thus, an overall transfer function for the analog circuitry 30 is achieved that includes portions attributable to both the log amplifier 32 and the linear amplifier 34 (i.e., both a non-linear and a linear portion). In the illustrated embodiment, the selection unit 36 is shown as a difference amplifier that is connected as a gate so that the greater of two base voltages on the two transistors will appear across an output emitter resistor $R_1$ to generate output signal 40. As will be apparent to a person of ordinary skill in the art, a number of alternative selection schemes can also be used.

Figure 3:
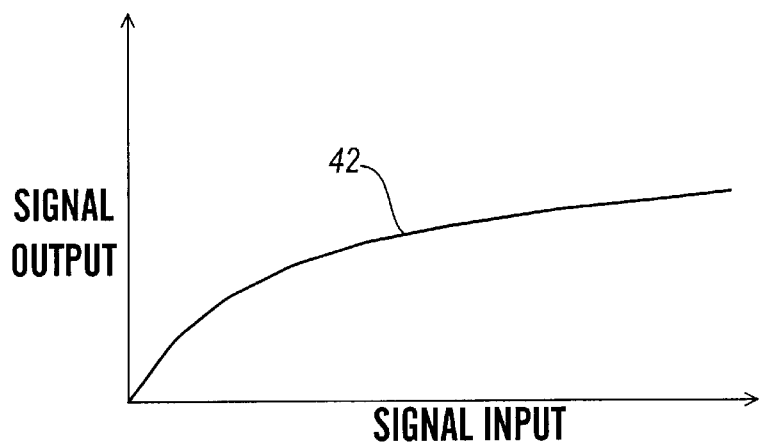
FIGS. 3–5 are graphs illustrating transfer functions of elements within the analog circuitry of FIG. 2.
Figure 4:
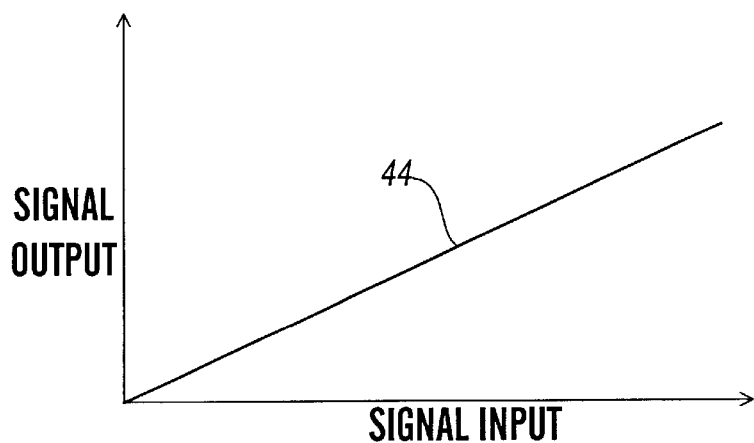
Figure 5:
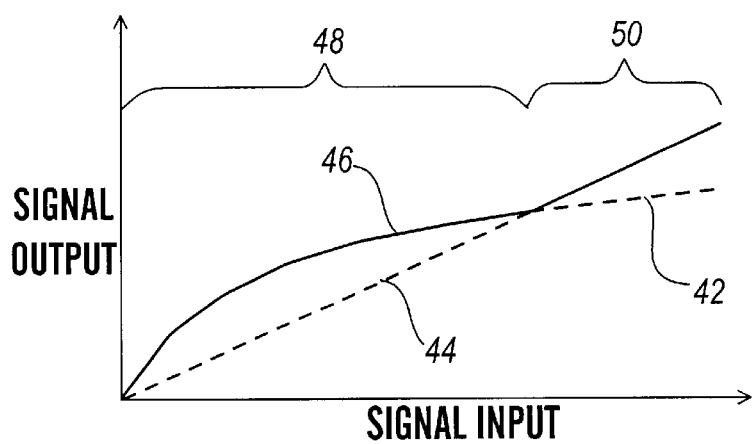

FIGS. 3, 4, and 5 are graphs illustrating the transfer functions of the elements within the analog circuitry 30 of FIG. 2 in accordance with one embodiment of the present invention. FIG. 3 illustrates the non-linear transfer function 42 of the log amplifier 32 of FIG. 2. FIG. 4 illustrates the linear transfer function 44 of the linear amplifier 34 of FIG. 2. FIG. 5 illustrates the composite transfer function 46 of the analog circuitry 30 of FIG. 2 after selecting the greater of the two output signals from the log amplifier 32 and the linear amplifier 34. As illustrated in FIG. 5, the composite transfer function 46 (illustrated as a solid line) includes a non-linear portion 48 that corresponds to a region where the output of the log amplifier 32 is greater then the output of the linear amplifier 34 and a linear portion 50 that corresponds to a region where the output of the linear amplifier 34 is greater then the output of the log amplifier 32. The overall result is a transfer function 46 that is capable of enhancing both high and low level detail in high dynamic range signals while compressing middle level signals in the same image.

Figure 6:
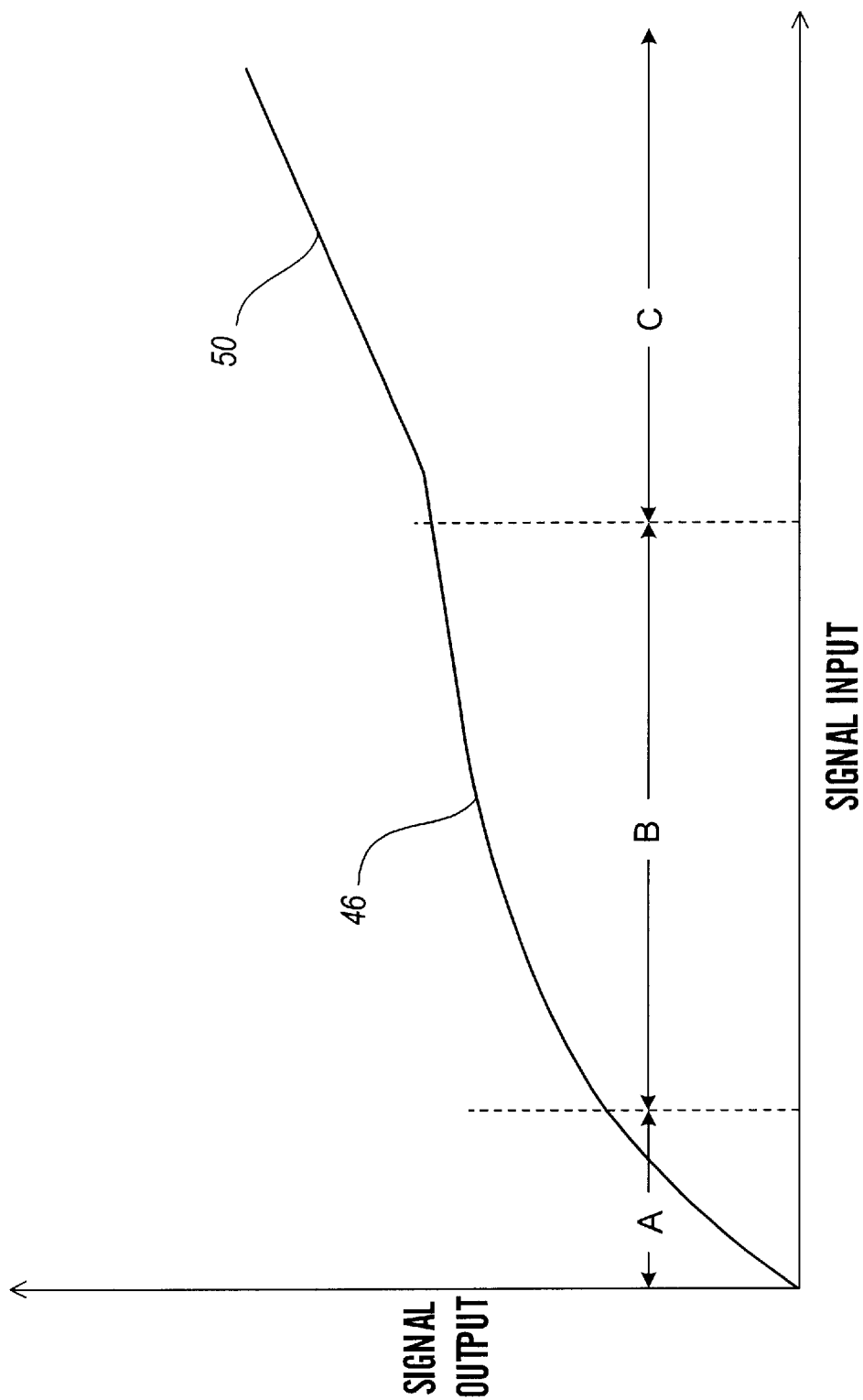
FIG. 6 is an expanded view of the transfer function of FIG. 5.

FIG. 6 is an expanded view of the transfer function 46 of FIG. 5. As shown, the transfer function 46 is characterized as having three distinct regions A, B, and C, each corresponding to a different input image intensity range. That is, the first region A operates upon low level components of an input signal, the second region B operates upon medium level components of the input signal, and the third region C operates upon high level components of the input signal. As shown, the first region A of the transfer function 46 is characterized by a relatively high, approximately linear gain as evidenced by the relatively large slope of the transfer function 46 in this region. This high gain is operative for stretching the low level signals so that an enhanced contrast is achieved for the low level detail in the image. The second region B is characterized by a lower, non-linear gain as evidenced by the decreased slope of the transfer function 46 in region B. Thus, the mid-level signal components will be compressed with respect to the low level components. The third region C provides a relatively high, linear gain as indicated by the slope of the linear portion 50 of the transfer function 46. This linear gain will stretch the high level signals to achieve greater high level contrast in the resulting image signal.

Because the sensor subsystem 12 generates a signal having a peak value that is indicative of the dynamic range of the input image 20, the type of processing provided by the electronic image processing subsystem 14 will vary based upon the dynamic range of the input image. Significantly, the processing will adjust automatically to changes in input dynamic range because images having different dynamic ranges will utilize different percentages of the transfer function 46. For example, a low dynamic range input signal will be confined to region A of the transfer function 46 and will thus experience a relatively large amount of gain which will stretch the signal, thereby increasing the contrast within the low level portions of the associated image. A medium dynamic range signal will be processed by both region A and region B of the transfer function 46 so that the medium level signals are compressed with respect to the low level signals in a manner similar to the well known gamma correction function commonly used in imaging systems. A high dynamic range signal will be processed by all three regions A, B, and C of the transfer function 46, thus expanding both the low and high level portions of the input signal while compressing the medium level portions thereof. This third type of processing is ideal for enhancing images that include a large amount of low level detail with a few high intensity point sources of light. Thus, the overall processing profile provided by the electronic image processing subsystem 14 automatically adjusts to changes in the dynamic range of the input image without the use of feedback techniques.

The specific shape of the multiple order transfer function 46 will depend upon the overall processing effect desired and the types of images that are anticipated in the imaging system 10. For example, an imaging system that will be used predominantly in low light imaging applications will normally use a different transfer function from a system that will be used predominantly during daylight applications. In a preferred approach, the shape of the transfer function 46 is determined during the design stage based on the intended application and remains fixed during the life of the system.

It should be appreciated that the transfer function of the electronic image processing subsystem 14 can be implemented digitally rather than using analog circuitry as discussed above. In such a case, the electrical image signal 22 would be represented as a series of digital sample values that each indicate an amplitude of the signal at a corresponding sample time. The digital values are modified within the electronic image processing subsystem 14 based on a predetermined gain profile stored in the electronic image processing subsystem 14 or elsewhere in the system. The gain profile is selected to achieve a transfer function such as the one illustrated in FIG. 6. In one embodiment, a simple lookup table approach is used where each digital sample value input into the electronic image processing subsystem 14 is replaced by a value stored in a lookup table memory location corresponding to the digital value.

The AGC unit 16 is operative for performing a conventional automatic gain control function on the enhanced electrical image signal 24 that is output by the electrical image processing subsystem 14. That is, the AGC unit 16 amplifies the signal 24 so that a peak amplitude of the resultant signal assumes a predetermined level. The predetermined level used by the AGC 16 will normally be dictated by the capabilities/requirements of the storage/display unit 18. For example, a cathode ray tube (CRT) display unit will normally have a maximum input signal amplitude that should not be exceeded. The AGC 16 will insure that maximum use of the dynamic range of the CRT display is achieved without over driving the unit. Preferably, the AGC 16 will be a linear amplification device that applies an equal gain to all intensity levels in the enhanced electrical image signal 24. Methods for achieving such gain control are well known in the art.

Figure 7:
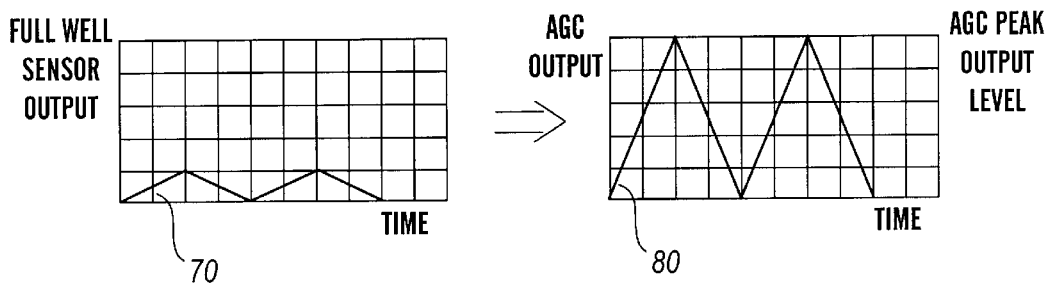
FIGS. 7–9 are waveform diagrams illustrating the conversion of electronic image signals within the electronic image processing unit and automatic gain control unit of FIG. 1 for various input dynamic ranges in one embodiment of the present invention.
Figure 8:
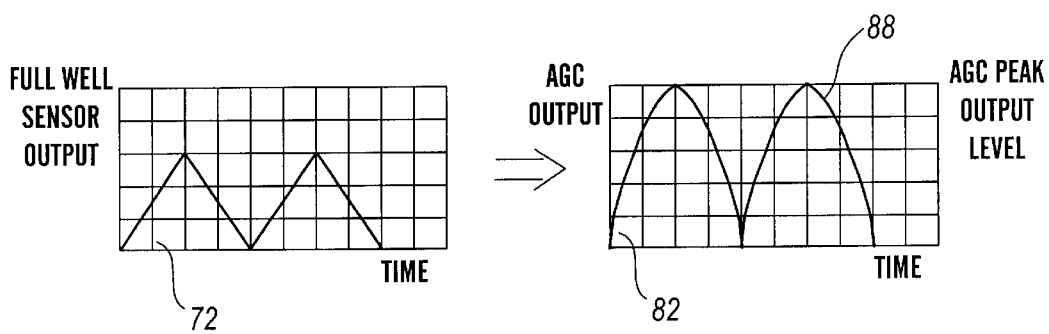
Figure 9:
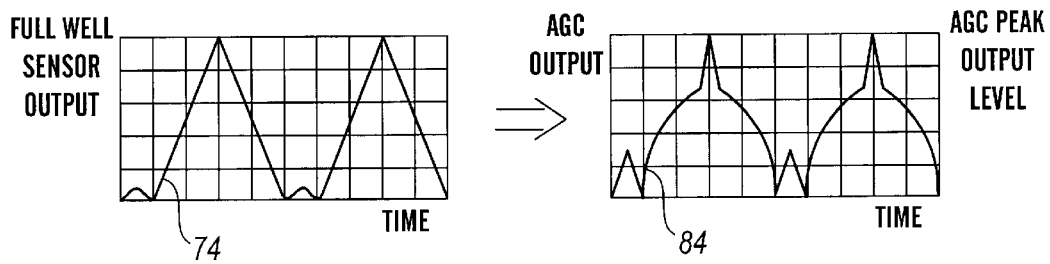

FIGS. 7, 8, and 9 are waveform diagrams illustrating the conversion of electronic image signals within the electronic image processing unit 14 and AGC 16 for various input dynamic ranges in one embodiment of the present invention. FIG. 7 illustrates the conversion of a low dynamic range input scene 70, FIG. 8 illustrates the conversion of a medium dynamic range input scene 72, and FIG. 9 illustrates the conversion of a high dynamic range input scene 74. With reference to FIG. 7, the low dynamic range (i.e., flat) scene 70 is processed entirely within region A of the transfer function of FIG. 6 to generate output image 80. As shown, the conversion of low dynamic range scene 70 is almost linear. With reference to FIG. 8, the medium dynamic range scene 72 is processed within both region A and region B of the transfer function to generate output image 82. As shown, output image 82 has an equal amplitude to output image 80, but includes nonlinear portions 88 generated within region B of the transfer function where the mid-level signal are compressed. With reference to FIG. 9, the high dynamic range scene 74 is processed by all regions of the transfer function to generate output image 84. Thus, the flat portions of the scene 74 are processed by region A of the transfer function in an approximately linear manner, the medium level signal components within scene 74 are processed within region B of the transfer function in a non-linear fashion, and the high-level components within scene 74 are processed within region C of the transfer function in a linear fashion. Thus, the low-level and high-level portions of the input image 74 are enhanced while the mid-level portions are compressed. As illustrated, the peak amplitude of each of the output signals 80, 82, 84 is always equal to the predetermined peak output level of the AGC unit 16, regardless of the dynamic range of the input signal.

Although the present invention has been described in conjunction with its preferred embodiments, it is to be understood that modifications and variations may be resorted to without departing from the spirit and scope of the invention as those skilled in the art readily understand. For example, the inventive principles are not limited to use with light images and can also be used with other types of images, such as thermal images. Such modifications and variations are considered to be within the purview and scope of the invention and the appended claims.

What is claimed is:

1. An image capture system comprising:

an image sensor for sensing an external image and for generating an electrical signal representative thereof;

an image processor for processing said electrical signal to enhance a quality of said electrical signal, said image processor modifying low level signal components within said electrical signal by gains within a first gain range medium level signal components within said electrical signal by gains within a second gain range, and high level signal components within said electrical signal by gains within a third gain range to generate an enhanced electrical signal; and an automatic gain control (AGC) unit having a predetermined peak output level and being coupled to an output of said image processor for modifying said enhanced electrical signal, said AGC unit outputting an electrical image signal with at least one peak amplitude that is substantially equal to said AGC unit predetermined peak output level when said electrical signal has low level signal components and not medium level and high level signal components, when said electrical signal has low level and medium level signal components and not high level signal components, and when said electrical signal has low level, medium level and high level signal components;

wherein said electrical signal output by said image sensor is provided independently of one or more of feed forward and feedback control relative to each of said image processor and said AGC, said enhanced electrical signal output by said image processor is provided independently of one or more of feed forward and feedback control relative to said image sensor and said AGC, and said electrical image signal output by said AGC is provided independently of one or more of feed forward and feedback control relative to said image sensor and said image processor, and said image processor functions independently of one or more of feedback and feed forward control in providing said enhanced electrical signal.

2. The image sensor claimed in claim 1, wherein:

said electrical signal generated by said image sensor includes a peak signal amplitude that is indicative of a dynamic range of said external image.

3. The image capture system claimed in claim 1, wherein:

said image processor modifies said low level signal components and said medium level signal components using a non-linear transfer function and said high level signal components using a linear transfer function.

4. The image capture system claimed in claim 1, wherein:

said image processor includes a non-linear amplifier unit for amplifying said electrical signal according to a non-linear transfer function, said non-linear amplifier unit generating a first output signal.

5. The image capture system claimed in claim 4, wherein:

said image processor includes a linear amplifier unit for amplifying said electrical signal according to a linear transfer function, said linear amplifier unit generating a second output signal.

6. The image capture system claimed in claim 1, wherein:
said AGC unit has a linear response characteristic.

7. The image capture system claimed in claim 1, further comprising:
a storage/display unit in communication with said automatic gain control and in which said electrical image signal is directly sent to said storage/display unit from said automatic gain control.

8. The image capture system claimed in claim 1, wherein:
at least a majority of said first gain range is non-linear having a first slope, at least a majority of said second gain range is non-linear having a second slope, and at least a majority of said third gain range is linear having a third slope, said first slope being greater than said third slope and said second slope being positive.

9. An image capture system comprising:
an image sensor for sensing an external image and for generating an electrical signal representative thereof; and
an image processor for processing said electrical signal to enhance a quality of said electrical signal, said image processor modifying low level signal components within said electrical signal by gains within a first gain range, medium level signal components within said electrical signal by gains within a second gain range, and high level signal components within said electrical signal by gains within a third gain range to generate an enhanced electrical signal, said image processor including a non-linear amplifier unit for amplifying said electrical signal according to a non-linear transfer function, said non-linear amplifier unit generating a first output signal, said image processor including a linear amplifier unit for amplifying said electrical signal according to a linear transfer function, said linear amplifier unit generating a second output signal, said image processor including a selection unit coupled to said non-linear amplifier unit and said linear amplifier unit for selecting a greater of said first output signal and said second output signal;
wherein said second gain range is lower than said first and third gain ranges so that medium level signal components within said enhanced electrical signal are compressed with respect to low level and high level signal components within said enhanced electrical signal.

10. A system for use in processing image signals comprising:
a sensor unit for sensing a light image received from an exterior environment and for generating an electrical signal representative thereof, said electrical signal having a peak amplitude that is indicative of a dynamic range of the light image;
a processor unit for processing said electrical signal to generate an enhanced electrical signal, said processor unit having a transfer function describing an output signal level of said processor unit as a function of an input signal level of said processor unit, said transfer function having a first portion corresponding to input signal components within a first level range and a second portion corresponding to input signal components within a second level range, said first portion having a non-linear response characteristic and said second portion having a linear response characteristic said processor unit including a non-linear amplifier for amplifying said electrical signal according to the non-linear response characteristic to generate a first signal, a linear amplifier for amplifying said electrical signal according to a linear response characteristic to generate a second signal, and a selection device for selecting a larger of said first signal and said second signal to generate an output signal thereof; and
an automatic gain control (AGC) unit for modifying said enhanced electrical signal to generate an image signal having a predetermined maximum amplitude value.

11. The system claimed in claim 10, wherein:
said first portion of said transfer function processes low level input signal components and said second portion of said transfer function processes high level input signal components.

12. The system claimed in claim 10, wherein:
said processor unit amplifies low amplitude portions of said electrical signal by gains within a first range, medium amplitude portions of said electrical signal by gains within a second range, and high amplitude portions of said electrical signal by gains within a third range, wherein said first and third range are greater than said second range.

13. The system claimed in claim 9, wherein:
said AGC unit has a substantially linear response characteristic.

14. An electronic image processing unit for use in an imaging system, comprising:
an input for receiving an electrical image signal representative of an external scene;
a first amplifier coupled to said input for amplifying said electrical image signal according to a first response characteristic, said first amplifier generating a first output signal;
a second amplifier coupled to said input for amplifying said electrical image signal according to a second response characteristic that is different from said first response characteristic, said second amplifier generating a second output signal; and
a selection unit coupled to said first and second amplifiers for continuously selecting a greater of said first output signal and said second output signal to generate a composite signal that is output by said electronic image processing unit.

15. The electronic image processing unit claimed in claim 14, wherein:
said first amplifier has a non-linear response characteristic so that said amplitude of said first output signal is non-linearly related to an amplitude of said electrical image signal.

16. The electronic image processing unit claimed in claim 15, wherein:
said first amplifier includes a log amplifier.

17. The electronic image processing unit claimed in claim 14, wherein:
said second amplifier has a linear response characteristic so that said amplitude of said second output signal is linearly related to an amplitude of said electrical image signal.

18. The electronic image processing unit claimed in claim 14, wherein:
said selection unit includes a difference amplifier.

19. The electronic image processing unit claimed in claim 14, wherein:
said amplitude of said first output signal is greater than said amplitude of said second output signal when said amplitude of said electrical image signal is below a predetermined threshold.

20. The electronic image processing unit claimed in claim 14, wherein:

said amplitude of said first output signal is less than said amplitude of said second output signal when said amplitude of said electrical image signal is above a predetermined threshold.

21. An image capture system comprising:

an image sensor for sensing an external image and for generating an electrical signal representative thereof; and an image processor for processing said electrical signal to enhance a quality in said electrical signal to provide an enhanced electrical signal, said image processor having a transfer function describing an output signal level of said image processor as a function of an input signal level of said image processor, said transfer function having a first region associated with input signal components within a first level range, a second region associated with input signal components within a second level range and a third region associated with input signal components within a third level range, wherein at least a majority of said first region is non-linear having a first slope, at least a majority of said second region is non-linear having a second slope, and at least a majority of said third region is linear having a third slope, said first slope being greater than said third slope and said second slope being positive, said first level range relates to a first gain range, said second level range relates to a second gain range and said third level range relates to a third gain range and in which said second gain range is lower than said first and third gain ranges so that second level range signal components within said enhanced electrical signal are compressed with respect to first level range and third level range signal components within said enhanced electrical signal.

22. An image capture system comprising:

an image sensor for sensing an external image and for generating an electrical signal representative thereof;

an image processor for processing said electrical signal to enhance a quality in said electrical signal to provide an enhanced electrical signal, said image processor having a transfer function describing an output signal level of said image processor as a function of an input signal level of said image processor, said transfer function having a first region associated with input signal components within a first level range, a second region associated with input signal components within a second level range and a third region associated with input signal components within a third level range, wherein at least a majority of said first region is non-linear having a first slope, at least a majority of said second region is non-linear having a second slope, and at least a majority of said third region is linear having a third slope, said first slope being greater than said third slope and said second slope being positive; and an automatic gain control (AGC) unit for modifying said enhanced electrical signal to generate an image signal having a predetermined maximum amplitude value;

wherein said electrical signal generated by said image sensor is provided independently of one or more of feed forward and feedback control relative to each of said image processor and said AGC, said enhanced electrical signal from said image processor is provided independently of one or more of feed forward and feedback control relative to said image sensor and said AGC, and said electrical image signal generated by said AGC is provided independently of one or more of feed forward and feedback control relative to said image sensor and said image processor, and said image processor functions independently of one or more feedback and feed forward control in providing said enhanced electrical signal.

23. An image capture system comprising:

an image sensor for sensing an external image and for generating an electrical signal representative thereof; and an image processor for processing said electrical signal to enhance a quality in said electrical signal to provide an enhanced electrical signal, said image processor having a transfer function describing an output signal level of said image processor as a function of an input signal level of said image processor, said transfer function having a first region associated with input signal components within a first level range, a second region associated with input signal components within a second level range and a third region associated with input signal components within a third level range, wherein at least a majority of said first region is non-linear having a first slope, at least a majority of said second region is non-linear having a second slope, and at least a majority of said third region is linear having a third slope, said first slope being greater than said third slope and said second slope being positive, said image processor including a non-linear amplifier for amplifying said electrical signal according to a non-linear response characteristic to generate a first signal, a linear amplifier for amplifying said electrical signal according to a linear response characteristic to generate a second signal, and a selection device for selecting a larger of said first signal and said second signal.

* * * * *

UNITED STATES PATENT AND TRADEMARK OFFICE
Certificate

Patent No. 6,567,124 B1                                                                                    Patented: May 20, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tuan Tran, Arvada, CO; and Jon M. Burkepile, Longmont, CO.

Signed and Sealed this Twenty-third Day of November 2004.

WENDY GARBER
*Supervisory Patent Examiner*
Art Unit 2612